United States Patent
Kobayashi (10) Patent No.: US 10,873,673 B2
(45) Date of Patent: Dec. 22, 2020

(54) POWER RECEIVING APPARATUS, CONTROL METHOD THEREOF AND STORAGE MEDIUM

(71) Applicant: CANON KABUSHIKI KAISHA, Tokyo (JP)

(72) Inventor: Nobutsune Kobayashi, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/454,732

(22) Filed: Jun. 27, 2019

(65) Prior Publication Data

US 2020/0045188 A1   Feb. 6, 2020

(30) Foreign Application Priority Data

Aug. 1, 2018   (JP) .................. 2018-145000

(51) Int. Cl.
*H04N 1/00*   (2006.01)
*H04N 1/32*   (2006.01)
(Continued)

(52) U.S. Cl.
CPC ..... *H04N 1/00127* (2013.01); *G06F 13/4063* (2013.01); *G06K 9/00442* (2013.01);
(Continued)

(58) Field of Classification Search
CPC ............ B65H 2220/01; B65H 2220/03; B65H 2220/11; B65H 2513/106; B65H 2511/212; B65H 2513/11; B65H 2515/32; B65H 2511/22; B65H 2511/414; B65H 2513/511; B65H 2553/51; B65H 2701/1311; B65H 2701/1313; B65H 2220/02; B65H 2557/242; B65H 5/062; B65H 7/02; B65H 2511/52; B65H 3/0669; B65H 7/06; G05B 2219/45187; G05B 19/416; G05B 2219/41329; G05B 19/23; G05B 19/29; G05B 19/404; G05B 2219/41057; G05B 2219/42128; G05B 2219/43168; G05B 19/40; G05B 2219/41115; G05B 2219/42175; G05B 2219/43177; B41J 19/202; B41J 11/42; B41J 13/0009; B41J 29/38; B41J 11/008; B41J 11/0095;
(Continued)

(56) References Cited

U.S. PATENT DOCUMENTS

| 5,795,679 A | 8/1998 | Kawakami |
| 5,939,853 A * | 8/1999 | Masauji ............... G05B 19/40 318/685 |

(Continued)

FOREIGN PATENT DOCUMENTS

JP   2012-185661   9/2012

*Primary Examiner* — Negussie Worku
(74) *Attorney, Agent, or Firm* — Venable LLP (57) ABSTRACT

An object is to appropriately cope with that power supplied to a power receiving apparatus from an external device is not appropriate. An electronic device that drives by a bus power system and includes a detection unit configured to detect a drop in supply of power by the bus power system and a control unit configured to control the electronic device so that power consumption is reduced in a case where a drop in the supply of power is detected by the detection unit.

13 Claims, 8 Drawing Sheets

(51) Int. Cl.
  *G06K 9/00* (2006.01)
  *G06F 13/40* (2006.01)
(52) U.S. Cl.
  CPC ..... *H04N 1/00888* (2013.01); *H04N 1/32561* (2013.01); *G06F 2213/0042* (2013.01); *H04N 2201/0081* (2013.01)
(58) Field of Classification Search
  CPC ...... B41J 19/207; B41J 29/393; B41J 3/4071; B41J 11/006; H04N 1/047; H04N 1/10; H04N 1/1013; H04N 1/193; H04N 1/32; H04N 2201/0081; H04N 2201/04703; H04N 1/00127; H04N 1/00323; H04N 1/00795; H04N 1/00803; H04N 1/00827; H04N 1/1061; H04N 1/21; H04N 1/46; H04N 1/58; H04N 1/0473; H04N 1/1215; H04N 2201/0458; G01P 3/481; G11B 19/04; G11B 19/12; G11B 23/40; G11B 7/0037; H02P 3/08; H02P 7/2805; H03M 1/206; H03M 1/303; G06F 17/2795
  USPC ........................................................ 358/1.14
  See application file for complete search history.

(56) References Cited

U.S. PATENT DOCUMENTS

| | | | |
|---|---|---|---|
| 6,495,289 B1 | 12/2002 | Kawakami | |
| 6,940,252 B2* | 9/2005 | Kobayashi | B41J 19/202 318/560 |
| 7,078,875 B2* | 7/2006 | Shoji | G05B 19/404 318/626 |
| 7,097,264 B2* | 8/2006 | Saito | B41J 29/38 347/16 |
| 7,298,416 B2* | 11/2007 | Uryu | H04N 1/00127 348/372 |
| 8,373,374 B2* | 2/2013 | Kanoyadani | G05B 19/40 318/466 |
| 9,232,106 B2* | 1/2016 | Nishida | H04N 1/047 |
| 10,362,192 B2* | 7/2019 | Harada | H04N 1/00803 |
| 10,585,816 B1* | 3/2020 | Lambert | G06F 13/4295 |
| 2005/0052681 A1* | 3/2005 | Kogi | H04N 1/00323 358/1.14 |
| 2014/0063528 A1* | 3/2014 | Hirose | H04N 1/00323 358/1.13 |
| 2014/0104636 A1* | 4/2014 | Baba | H04N 1/00323 358/1.14 |
| 2014/0160505 A1* | 6/2014 | Tachikawa | H04N 1/00323 358/1.13 |
| 2014/0181471 A1* | 6/2014 | Juang | G06F 11/3024 712/30 |
| 2014/0195840 A1* | 7/2014 | Yang | G06F 1/3228 713/323 |
| 2014/0215234 A1* | 7/2014 | Hayashi | H04N 5/23241 713/310 |
| 2015/0317548 A1* | 11/2015 | Yano | G06K 15/02 358/1.9 |
| 2016/0124481 A1* | 5/2016 | Avadhanam | G06F 1/28 713/340 |
| 2016/0156798 A1* | 6/2016 | Wang | H04N 1/00896 358/1.14 |
| 2017/0013155 A1* | 1/2017 | Yokoyama | H04N 1/00037 |
| 2017/0371398 A1* | 12/2017 | Umimura | H04N 1/00885 |
| 2018/0034994 A1* | 2/2018 | Kawahara | H04N 1/00323 |
| 2018/0069979 A1* | 3/2018 | Ito | H04N 1/00891 |
| 2019/0166263 A1* | 5/2019 | Furusawa | H04N 1/00323 |
| 2019/0204896 A1* | 7/2019 | Kitanosako | G06F 1/3206 |
| 2019/0278315 A1* | 9/2019 | Dornseifer | G01R 31/40 |

* cited by examiner

MOVEMENT DIRECTION OF
CIS UNIT DURING SCAN OPERATION FIG.2B

MOVEMENT DIRECTION OF
CIS UNIT DURING SCAN OPERATION FIG.2C

FIG.3

1p +5V(Vbus)
2p D-
3p D+
4p ID
5p GND

POWER RECEIVING APPARATUS, CONTROL METHOD THEREOF AND STORAGE MEDIUM

BACKGROUND OF THE INVENTION

Field of the Invention

The present invention relates to a power receiving apparatus, a control method thereof, and a storage medium.

Description of the Related Art

There is known a power receiving apparatus compatible with a bus power operation, which is connected with an external device, such as a PC, via a communication cable, and receives supply of power for drive from the communication cable. As the power receiving apparatus compatible with the bus power operation, for example, there is a scanner that optically reads a document (Japanese Patent Laid-Open No. 2012-185661), or the like.

Incidentally, in the power receiving system as described above, a case may occur where power supplied to the power receiving apparatus from an external device is not appropriate. As the power receiving apparatus that drives on power supplied from an external device prevails, proposal of a method of coping with that power supplied to the power receiving apparatus from an external device is not appropriate is requested.

Consequently, an object of the present invention is to appropriately cope with that power supplied to a power receiving apparatus from an external device is no appropriate.

SUMMARY OF THE INVENTION

The power receiving apparatus according to the present invention is a power receiving apparatus that is enabled to drive by receiving supply of power from a power supplying device outside the power receiving apparatus, and includes: a receiving unit configured to receive supply of power whose magnitude is based on power consumption of the power receiving apparatus from the power supplying device via a predetermined interface; and a shifting unit configured to shift a state of the power supplying device from a first state into a second state where power consumption is smaller than that in the first state in a case where power supplied from the power supplying device is less than a predetermined value.

Further features of the present invention will become apparent from the following description of exemplary embodiments with reference to the attached drawings.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

A power supplying device and a power receiving apparatus that receives supply of power from the power supplying device in the present embodiment are explained. In the present embodiment, as the power supplying device, a personal computer (PC) is illustrated. The power supplying device may be any device as long as it is possible to supply power to the power receiving apparatus and for example, may be a device, such as a smartphone, a tablet terminal, a PDA, a digital camera, a hard disk (HDD), and an optional device that can be attached to the power supplying device. Further, in the present embodiment, as the power receiving apparatus, a single function scanner (SFS), which is an image reading device, is illustrated. The power receiving apparatus may be any apparatus that receives supply of power from the power supplying device and for example, may be an apparatus, such as a printer. Further, the power receiving apparatus is not limited to a single function apparatus and may be, for example, a multi function apparatus having both the printing function and the image reading function.

In the present embodiment, it is assumed that the power receiving apparatus drives by the bus power system in which the power receiving apparatus receives supply of power from the power supplying device via a USB (Universal Serial Bus) standard communication cable (hereinafter, simply described as "USB cable").

System Configuration

Figure 1A:
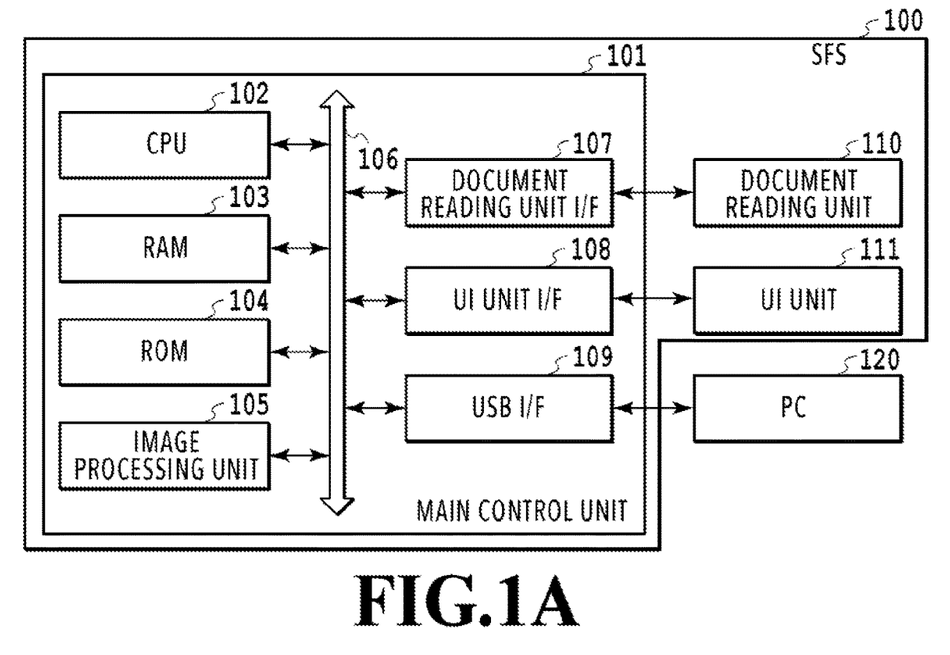
FIG. 1A is a diagram showing an example of a system configuration diagram and FIG. 1B is a block diagram showing in detail a relationship between each unit relating to a scan operation in an SFS.

FIG. 1A is a system configuration diagram of the present embodiment and in the system of the present embodiment, an SFS 100, which is a power receiving apparatus, is connected to a PC 120, which is a power supplying device, via a USB cable. In FIG. 1A, in addition to main hardware (main control unit 101, document reading unit 110, and UI unit 112) configuring the SFS 100, the internal configuration of the main control unit 101 is also shown. By a CUP 102, a RAM 103, a ROM 104 and the like, the computer of the SFS 100 is formed.

The main control unit 101 controls the operation of the entire SFS 100. The CPU 102 controls each unit within the main control unit 101 by loading a program stored in the ROM 104 onto the RAM 103 and reading and executing the program as needed. The RAM 103 is a main storage memory of the CPU 102 and used as a work area and a temporary storage area for loading various programs stored in the ROM 104. The ROM 104 stores image data, various programs, and various kinds of setting information. In the present embodiment, as the ROM 104, a flash storage or the like is supposed, but the ROM 104 may be an auxiliary storage device, such as a hard disk. It is assumed that the SFS 100 performs each piece of processing shown in flowcharts, to be described later, by the one CPU 102 using one memory (RAM 103), but another aspect may be accepted. For example, it is also possible to perform each piece of processing shown in flowcharts, to be described later, by causing a plurality of CPUs and a plurality of RAMs, ROMs, and storages to cooperate with one another. Further, it may also be possible to perform part of processing by using a hardware circuit. A document reading unit I/F 107 is an interface that connects the image reading unit 110 and the main control unit 101. The image reading unit 110 generates digital image data by optically scanning a document set on the SFS 100 and transfers the digital image data to the RAM 103 of the main control unit 101 via the document reading unit I/F 107. A UI unit I/F 108 is an interface that connects a UI unit 111 and the main control unit 101. The UI unit 111 is provided with a liquid crystal display having a touch panel function, operation keys, and the like and also functions as an input unit configured to receive user instructions. A USB I/F 109 controls communication with the PC 120 USB-connected to the SFS 100. For example, in a case where a scan execution command is sent to the SFS 100 from the PC 120 via a USB cable, the USB I/F 109 receives the command signal and saves the signal in the RAM 103. The CPU 102 causes the document reading unit 110 to perform the scan operation via the document reading unit I/F 107 and temporarily saves the acquired digital image data in the RAM 103. The digital image data saved in the RAM 103 is transferred to the PC 120 via the USB I/F 109. In a case of checking that the digital image data is transferred to the PC 120, the CPU 102 deletes the digital image data saved in the RAM 103. In a case where the transfer and deletion of all the pieces of digital image data are completed, the scan operation requested by the PC 120 is also completed. An image processing unit 105 is used in a case where it is necessary to perform image processing or correction for the digital image data obtained by the scan operation. The image processing unit 105 is mainly used in a case where processing that takes time by the image processing or correction by a predetermined program loaded onto the RAM 103 is performed by a hardware function.

Figure 1B:
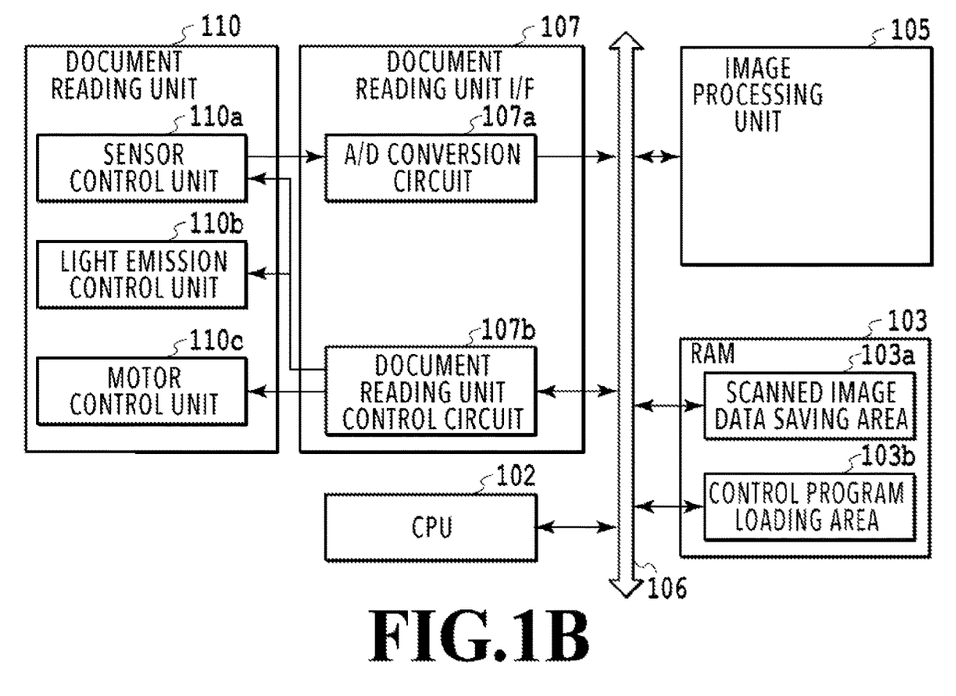

FIG. 1B is a block diagram showing in more detail the relationship between each unit relating to the scan operation in the SFS 100. The document reading unit 110 includes a sensor control unit 110a, a light emission control unit 110b, and a motor control unit 110c. The sensor control unit 110a performs operation control of an image sensor array 209, the light emission control unit 110b performs lighting control of an LED 208, and the motor control unit 110c performs drive control of a motor, which is a main part of an actuator, respectively. The document reading unit I/F 107 includes an A/D conversion circuit 107a and a document reading unit control circuit 107b. The A/D conversion circuit 107a converts analog data input from the sensor control unit 110a into digital data. Within the RAM 103, there are a scanned image data saving area 103a and a control program loading area 103b.

In the present embodiment, it is possible for the SFS 100 to receive supply of power from the PC 120 USB-connected to the SFS 100 via a USB cable based on the USB power delivery standard. At this time, the SFS 100 transmits a request to supply power to the PC 120 and receives power in accordance with the request to supply power from the PC 120. The request to supply power is, for example, information in the format specified by the USB power delivery standard and information for requesting the power supplying device to supply power. In the request to supply power, setting information relating to supply of power that is requested, such as the value of current that is requested and the value of voltage that is requested, is included. The contents of the request to supply power are determined in accordance with, for example, the model type or the specifications of the power receiving apparatus that transmits the request to supply power. Then, in the present embodiment, the SFS 100 controls the magnitude of power the PC 120 is requested to supply in accordance with the state of power consumption of the SFS 100 itself. That is, in a case where the SFS 100 is in the state where power consumption of the SFS 100 itself is small, the SFS 100 requests the PC 120 to supply small power and receives supply of small power from the PC 120. On the other hand, in a case where the SFS 100 is in the state where power consumption of the SFS 100 itself is large, the SFS 100 requests the PC 120 to supply large power and receives supply of large power from the PC 120. The magnitude of power that the PC 120 can be requested to supply is determined based on, for example, the standard of the interface that is used for supply of power and the specifications of the PC 120 and the SFS 100.

Outline of SFS

Figure 2A:
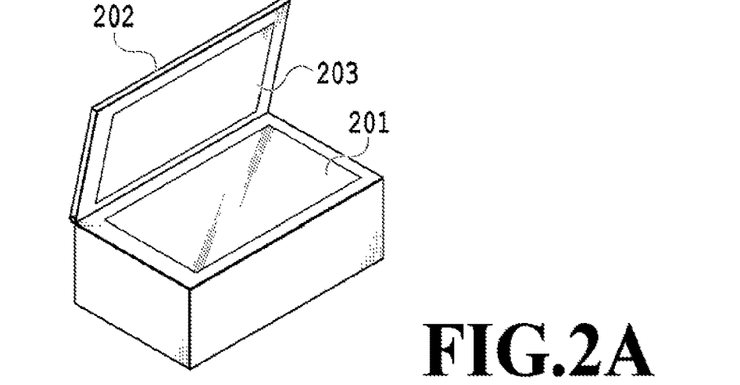
FIG. 2A is an external appearance diagram of the SFS.

FIG. 2A is an external appearance diagram of the SFS 100. A document table 201 is a place at which a user places a scan-target document. A document table cover 202 is a pressure plate that presses and fixes a document to the document table 201 and has a role to lessen the influence of external light, and so on. A white sheet 203 is attached to the document table cover 202 for forming the portion other than a document as a white image.

Figure 2B:
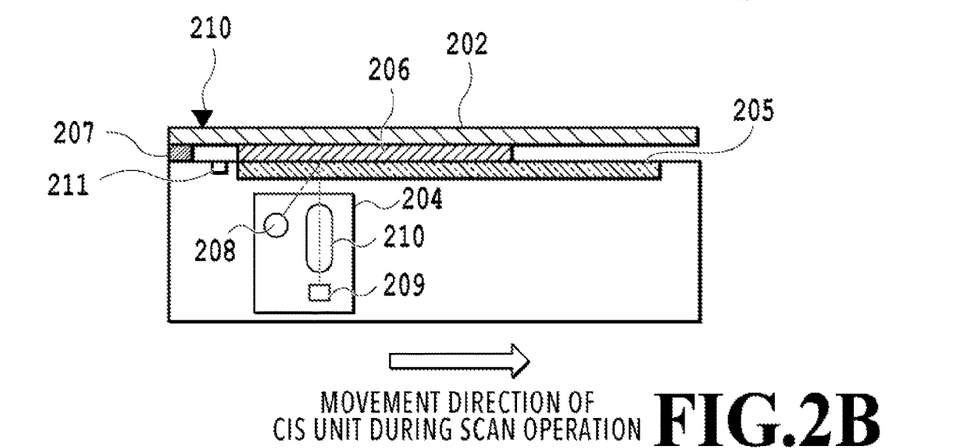
FIG. 2B is a section diagram showing an internal structure of the SFS.

FIG. 2B is a section diagram showing the internal structure of the SFS 100. As shown in FIG. 2B, inside the SFS 100, a contact image sensor (CIS) unit 204 exists and configured to move in one direction by an actuator, not shown schematically. A contact glass 205 has a function to keep constant the distance between the scanner sensor and a document 206. It is possible for a user to lift up the document table cover 202 by using a hinge 207 installed on the document table 201 as a fulcrum. In a case where the document table cover 202 is lifted up, it is possible to set a document on the document table 201. The LED 208 is a light emitting member and generates light and illuminates the document 206. The image sensor array 209 generates an image signal by photoelectric conversion. A rod lens array 210 guides light reflected from the document 206 to the image sensor array 209. The LED 208, the image sensor array 209, and the rod lens array 210 are components of the CIS unit 204. The image sensor array 209 includes a plurality of sensors and each output is subjected to A/D conversion. A home position 210 is a reference position of the CIS unit 204 during the operation standby. A reference position mark 211 is a mark for detecting the reference position at the time of controlling the position of a document in the sub scanning direction.

Figure 2C:
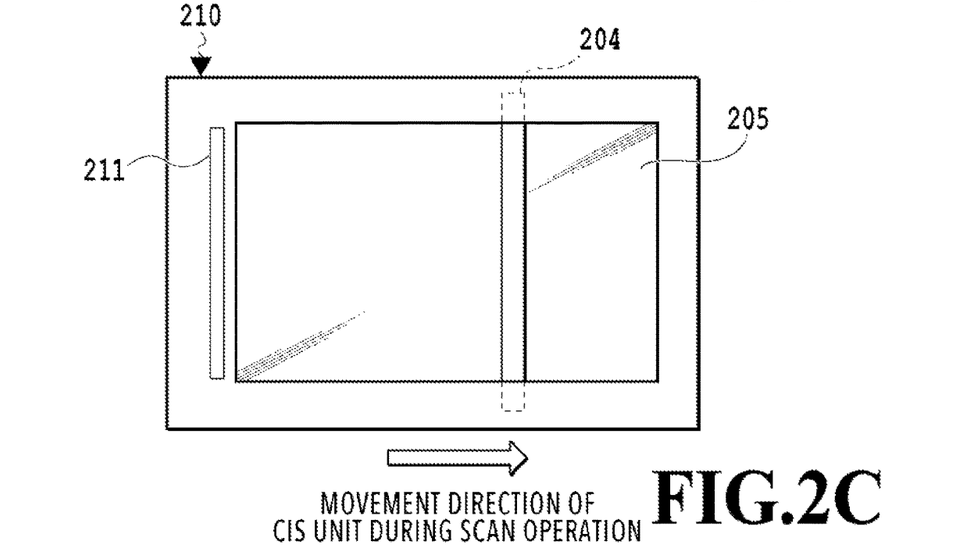
FIG. 2C is a bird's eye diagram of the SFS from directly above.

FIG. 2C is a bird's-eye diagram of the SFS 100 from directly above and shows the state at a certain instant during execution of the scan operation (state where the CIS unit 204 is not at the standby position). The image sensor array 209 has a configuration in which sensors that perform photoelectric conversion are arranged one-dimensionally. In the present specification, the direction in which the sensors are arranged side by side is referred to as the "main scanning direction of the sensor". Then, the output of one line in the main scanning direction is saved in the RAM 103.

Software Configuration of SFS

Figure 3:
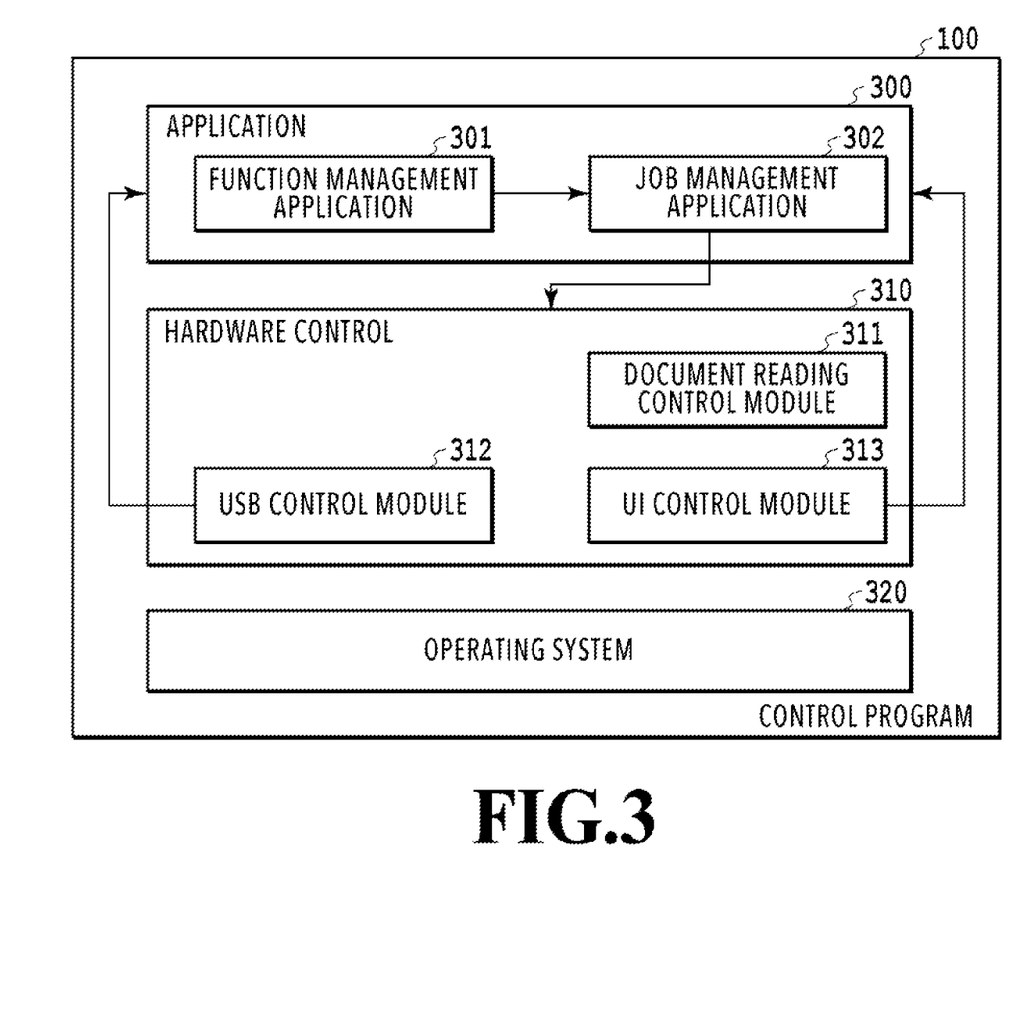
FIG. 3 is a diagram showing a software configuration of the SFS.

Next, the software configuration of the SFS 100 is explained. FIG. 3 is a diagram showing details of control programs of a variety of pieces of hardware described above. The control programs are divided into three blocks: an application 300, hardware control 310, and an operating system 320.

The operating system 320 provides fundamental functions for the main control unit 101 to perform the control programs. The hardware control 310 is a software group that controls I/Fs with hardware devices. Then, the hardware control 310 includes a document reading control module 311 configured to control the document reading unit I/F 107, a USB control module 312 configured to control the USB I/F 109, a UI control module 313 configured to control the UI unit I/F 108, and the like. The application 300 causes each device to operate via the hardware control 310 and implements various functions provided to a user by the SFS 100. For example, it is assumed that the USB control module 312 analyzes an input signal and it is turned out that the input signal is a scan execution command. In this case, first, a job management application 302 that performs a scan job is performed by a function management application 301. Then, the job management application 302 causes the document reading unit 110 to perform the scan operation by using the document reading control module 311 of the hardware control 310 and saves digital image data obtained by this in the RAM 103. In a case where some image processing or correction is necessary at the time of saving, the document reading control module 311 performs necessary processing by using the image processing unit 105. The digital image data accumulated in the RAM 103 in this manner is transferred to the PC 120 via the USB control module 312 afterward. By each module operating in an interlocking manner as described above, each function of the SFS 100 is implemented.

Here, the scan operation in the SFS 100 is explained in more detail in a time series.

In a case where a scan operation-target range is specified, first, the document reading control module 311 specifies a scan operation range in the main scanning direction in the image sensor array 209. Due to this, which range of the output of the image sensor array 209 is used as a scanned image is determined. Further, the document reading control module 311 specifies a scan operation range in the drive direction (sub scanning direction) of the CIS unit 204. Due to this, how far the CIS unit 204 moves in the drive direction to take an output is determined. Upon receipt of instructions to read a document from the document reading control module 311 via the document reading unit I/F 107, the document reading unit 110 lights the LED 208 and scans the document 206 set on the contact glass 205 while moving the CIS unit 204. Then, the document reading control module 311 takes the output of each color by changing incident light into R (red), G (green), and B (blue) and acquires color digital image data by combining the obtained output for each color. Because of this, during acquisition of a scanned image, the lighting color switches from R to G and from G to B. At this time, the reflected light from the document is guided to the image sensor array 209 via the rod lens array 210. In a case where the reflected light from the document enters the image sensor array 209 and the output of each color is obtained, the document reading control module 311 saves the outputs in the RAM 103. In this manner, digital image data obtained by optically reading the image on the document is generated. In a case where the scan of the document 206 is completed, the document reading control module 311 moves the CIS unit 204 to the standby position for the scan of the next document. The above is the series of flow of the scan operation.

Wire Connection Specifications of USB

Figure 4:
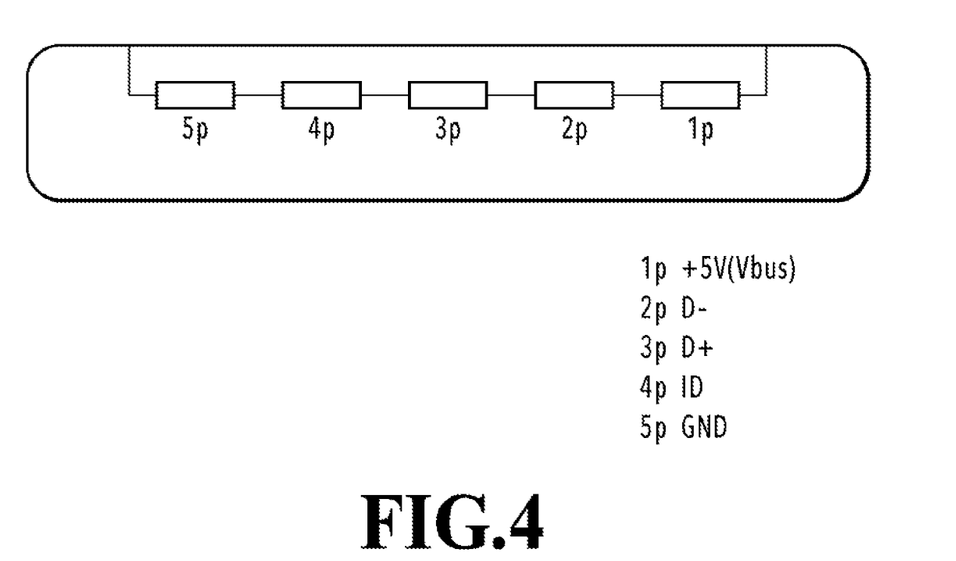
FIG. 4 is a diagram showing wire connection specifications in a micro (mini) USB.

A variety of kinds of USB whose transfer speed and connector shape are different exist. FIG. 4 is a diagram showing wire connection specifications in a micro (mini) USB. The first pin (1p) is called Vbus and has an electric potential of +5 V and the fifth pin (5p) is a ground. By these two pins, power is supplied from the PC 120 to the SFS 100. D− of the second pin (2p) and D+ of the third pin (3p) are signal lines for transmission and reception of data. By differential motion of these two signal lines, transmission of a signal is performed. The fourth pin (4p) is used for a purpose other than the functions of the above-described four pins.

Coping at the Time of Drop in Supply of Power

For example, depending on the standard of the interface used for connection with the PC 120, there is a case where power necessary for the SFS 100 to perform scan processing is not supplied. Further, for example, for the reason that an error has occurred in the PC 120, or the like, there is a case where the power supplied to the SFS 100 gradually drops. Coping in a case where power whose magnitude is appropriate is not supplied from the PC 120 to the SFS 100 as described above is explained.

Figure 5:
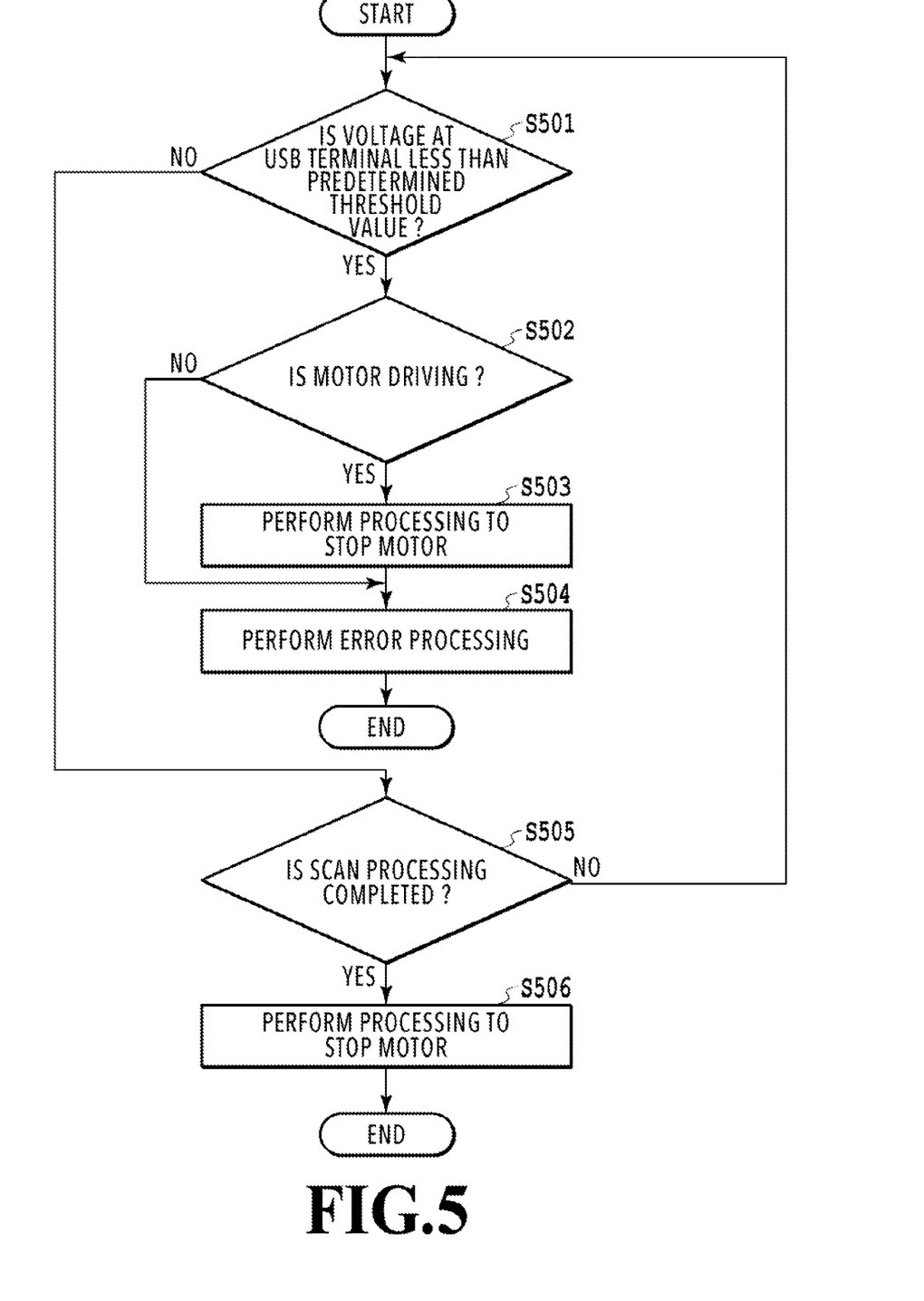
FIG. 5 is a flowchart showing a coping method in a case where power supplied from a host device drops according to a first embodiment.

FIG. 5 is a flowchart showing details of coping in the SFS 100 in a case where supply of power from the PC 120 drops according to the present embodiment. The series of processing shown in the flowchart in FIG. 5 is implemented by the CPU 102 reading a predetermined program stored in the ROM 104 and executing the program by using the RAM 103 as a work area. Symbol "S" at the top of each piece of processing means a step. Further, the processing of this flowchart is started based on the execution of the scan execution command.

In a case where scan processing is started based on that scan instructions are given, at S501, whether or not the voltage at the USB terminal is less than a predetermined threshold value is determined. The voltage at the USB terminal corresponds to the power source voltage supplied from the PC 120 via the USB cable and specifically, corresponds to the electric potential difference between the first pin and the fifth pin shown in FIG. 4 described previously. For example, in a case where the predetermined threshold value is 4.3 V and the voltage at the USB terminal is 4.0 V, the voltage at the USB terminal is determined to be less than the predetermined threshold value. In a case where results of this determination are YES, the processing advances to S502 and in a case where results of this determination are NO, the processing advances to S505.

At S502, whether or not the motor is driving is determined. This motor is, for example, the motor within an actuator that moves the CIS unit 204 and it is possible to determine by the state management of the motor control unit 110c described previously. In a case where determination results indicate that the motor is driving, the processing advances to S504 and in a case where the motor is not driving, the processing advances to S504.

At S503, processing to stop the motor is performed by the motor control unit 110c. At this time, in a case where the motor is stopped suddenly, there is a risk of damaging each part configuring the image reading unit 110, and therefore, it is desirable to slow down and then stop the motor.

At S504, error processing is performed by the main control unit 101. Specifically, first, error notification processing to display an error message on the UI unit 111, and so on is performed and following this, processing to stop supply of power source to the document reading unit 110, the image processing unit 105, and the like is performed by stopping the operation of the main circuits, such as the step-up circuit and the charging circuit. At the point in time the error processing is completed, the state of the SFS 100 is shifted into a state where power consumption is low (operation mode), and therefore, the power consumption of the SFS 100 is reduced significantly. That is, the power the SFS 100 requests the PC 120 to supply is reduced. After this, the processing of this flowchart is completed. Processing in a case where the voltage at the USB terminal is not less than the predetermined threshold value is explained.

At S505, whether or not the scan processing is completed is determined. The completion of the scan processing in the present embodiment specifically refers to the completion of processing to move the CIS unit 204 to the standby position after scanning the document 206 by the CIS unit 204. In a case where results of this determination are YES, the processing advances to S506 and in a case where results of this determination are NO, the processing returns to S501.

At S506, processing to stop the motor is performed by the motor control unit 110c. This processing is the same as that at S503. After this, the processing of this flowchart is completed.

The above is the coping method in the SFS 100 in a case where supply of power from the PC 120 drops in the present embodiment. The present embodiment is not limited to the image reading device and it is possible to widely apply the present embodiment to an electronic device that drives on power supplied from an external device via an interface. Because of this, for example, the interface for receiving supply of power may be another communication standard, for example, such as IEEE 1394, in place of USB.

As above, according to the present embodiment, in a case where the SFS 100 detects that the power supplied from the PC 120 is small, the scan processing being performed by the SFS 100 is stopped and power consumption is reduced. Due to this, in a case where the power supplied from the PC 120 is small, it is possible to suppress the SFS 100 from continuing to drive in the state where power consumption is high. Further, it is possible to suppress the PC 120 from being given a load because the power the PC 120 is requested to supply becomes large by the SFS 100 continuing to drive in the state where power consumption is high despite the state where the PC 120 can supply only small power to the SFS 100.

In the example described above, the aspect is explained in which the processing to monitor the supply of power from the PC 120 based on the threshold value determination processing at S501 is performed repeatedly from the start of the scan processing until the completion of the scan processing, but the aspect is not limited to the aspect such as this. For example, the processing to monitor the supply of power from the PC 120 may be performed repeatedly from the time the SFS 100 starts the drive by the supply of power from the PC 120 until the SFS 100 completes the drive by the supply of power from the PC 120.

Second Embodiment

In the first embodiment, in a case where the SFS 100 detects that the power supplied from the PC 120 is small, the operation of the SFS 100 is stopped to reduce power consumption. Following the above, an aspect is explained as a second embodiment in which power consumption is reduced by changing the operation mode in place of stopping the entire operation. Explanation of the contents in common to those of the first embodiment is omitted or simplified and in the following, a coping method in a case where supply of power drops, which is a different point, is explained mainly.

Figure 6:
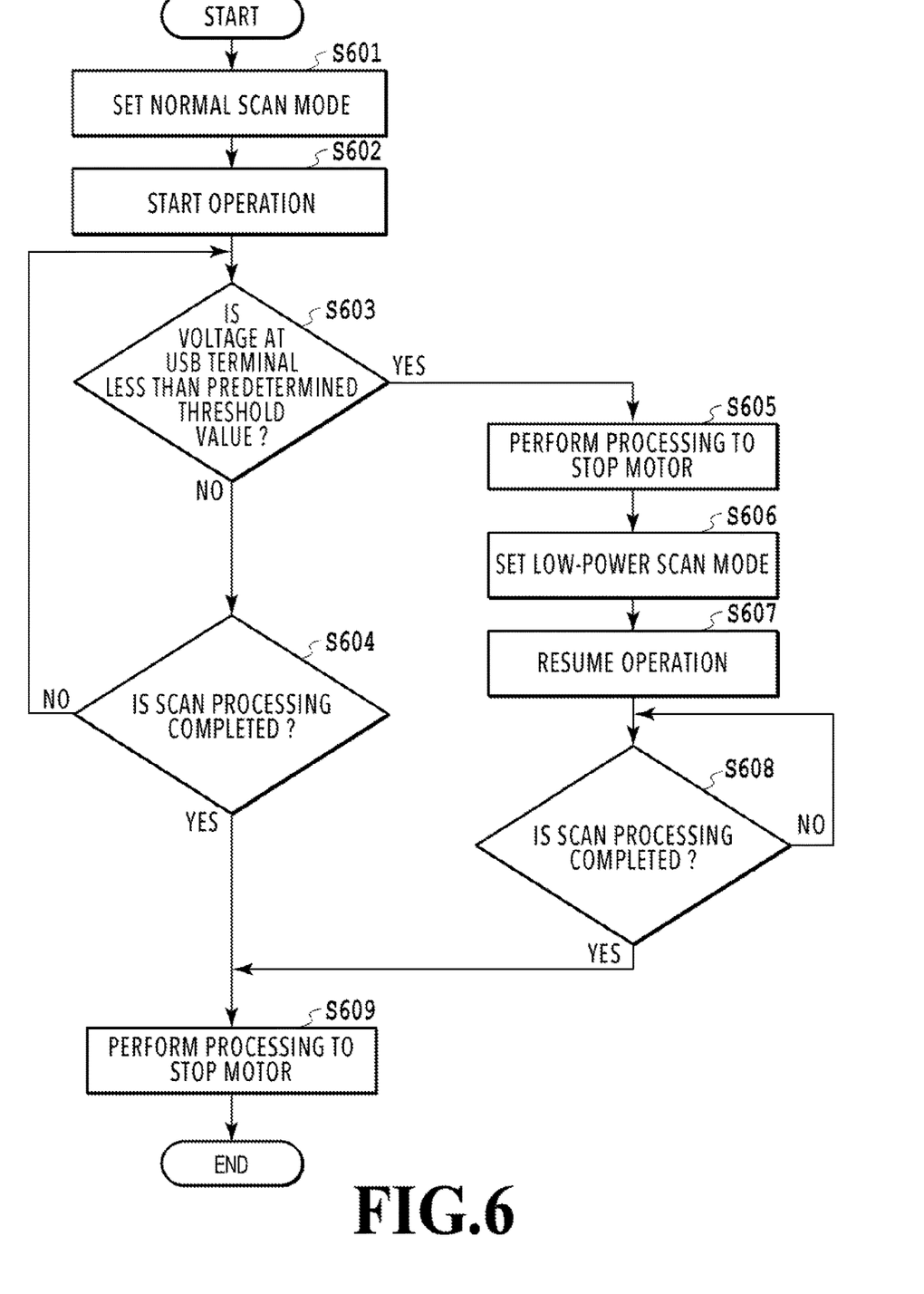
FIG. 6 is a flowchart showing a coping method in a case where power supplied from a host device drops according to a second embodiment.

FIG. 6 is a flowchart showing details of coping in the SFS 100 in a case where the supply of power from the PC 120 drops according to the present embodiment. The SFS 100 of the present embodiment includes a normal scan mode and a low-power scan mode as the operation mode thereof. The normal scan mode is characterized in that power consumption is higher than that in the low-power scan mode but the scan processing speed is higher. Then, the low-power scan mode has a merit that power consumption is low although the scan processing speed is lower than that in the normal scan mode. In the following, premised on this, explanation is given along the flow in FIG. 6. The series of processing shown in the flowchart in FIG. 6 is implemented by the CPU 102 reading a predetermined program stored in the ROM 104 and executing the program by using the RAM 103 as a work area. Further, the processing of this flowchart is started based on scan instructions being given.

At S601, as the operation mode to be applied, the normal scan mode is set. At this time, electric and software setting suitable to the normal scan mode is also performed. At S602 that follows, the scan processing in the normal scan mode is started.

At S603, whether or not the voltage at the USB terminal is less than a predetermined threshold value is determined. This determination processing is the same as the processing at S501 in the flow in FIG. 5 of the first embodiment. In a case where results of this determination are YES, the processing advances to S605 and in a case where results of this determination are NO, the processing advances to S604.

At S604, whether or not the scan processing is completed is determined. This determination processing is the same as the processing at S505 in the flow in FIG. 5 of the first embodiment. In a case where results of this determination are YES, the processing advances to S609 and in a case where results of this determination are NO, the processing returns to S603.

At S605, processing to stop the motor is performed by the motor control unit 110c. At S606 that follows, the setting of the operation mode is changed. Specifically, the operation mode is changed from the normal scan mode into the low-power scan mode. At this time, electric and software setting suitable to the low-power scan mode is performed, for example, the setting is changed to reduce the drive speed of the motor. Due to this, the scan processing speed is reduced, but it is possible to suppress power consumption. That is, the scan processing is continued, but the power the SFS 100 requests the PC 120 to supply is reduced. It may also be possible to omit the processing at S605 and to change the setting of the operation mode by reducing the speed of the motor without stopping the motor.

At S607, the scan processing having been kept stopped is resumed in the low-power scan mode after the setting is changed at S606. Then, at S608, as in the case with S604 described above, whether the CIS unit 204 has reached the target position is determined. In a case where the CIS unit 204 has reached the target position, the processing advances to S609 and then the processing to stop the motor is performed and this flow is terminated. On the other hand, in a case where the CIS unit 204 has not reached the target position, this step is repeated until the scan processing is completed.

The above is the coping method in the SFS 100 in a case where the supply of power from the PC 120 drops. As above, according to the present embodiment, in a case where the SFS 100 detects that the power supplied from the PC 120 is small, the operation mode in the SFS 100 is changed to reduce power consumption. Due to this, in a case where the power supplied from the PC 120 is small, it is possible to suppress the SFS 100 from continuing to drive in the state where power consumption is high. Further, it is possible to suppress the PC 120 from being given a load because the power the PC 120 is requested to supply becomes large by the SFS 100 continuing to drive in the state where power consumption is high despite the state where the PC 120 can supply only small power to the SFS 100.

Modification Example

In the example described above, by switching the two kinds of operation mode whose motor drive speed is different, control is performed so as to suppress power consumption, but this is not limited.

For example, it may also be possible to suppress power consumption by switching two kinds of scan mode whose lighting time of the LED 208 is different. The lighting time of the LED 208 is, specifically, the lighting time of the LED 208 each time one line is read. The scan mode whose lighting time of the LED 208 is long has a merit that the dynamic range in a case where a read image is converted from an analog signal into a digital signal is wide, but power consumption is high. Consequently, at the normal time, the scan mode whose lighting time of the LED 208 is long is set and in a case where a drop in the voltage at the USB terminal larger than or equal to a predetermined value is detected, the setting is changed so that the scan mode whose lighting time of the LED 208 is reduced is set. Due to this, it is possible to suppress power consumption. However, in a case where the lighting time of the LED 208 is reduced, the dynamic range is narrowed accordingly. Consequently, in this case, it is desirable to also change the setting of the shading correction for a read image.

Further, explanation is given by taking the example in which the scan mode is changed, but it may also be possible to suppress power consumption by, for example, reducing the frequency of the operation clock. It is possible to widely apply the method in this case also to an electronic device other than the image reading device. That it is possible to suppress the amount of consumed power by reducing the frequency of the operation clock is a well-known technique, and therefore, detailed explanation is omitted.

As above, according to the present embodiment, in a case where a drop in supplied voltage is detected on the electronic device side that receives supply of power from the host device by the bus power system, the setting of the operation mode or the like is changed so that power consumption is reduced. Due to this, as in the first embodiment, it is possible to prevent the host device on the side that supplies power from becoming overloaded.

Third Embodiment

As described previously, as the USB standard, a plurality of standards whose transfer speed is different exists and the power supply capacity is also different for each standard. Specifically, while the maximum value of a current in the power that can be supplied by the USB 2.0 standard is 500 mA, it is possible to supply power of a current of 900 mA at the maximum by the USB 3.0 standard. Consequently, an aspect is explained as a third embodiment in which the operation mode in an electronic device on the side that receives supply of power by the bus power system is switched in accordance with whether the connection interface is the high standard whose power supply capacity is high or the low standard whose power supply capacity is low. In the present embodiment also, explanation is given premised on the system including the SFS 100 and the PC 120 shown in FIG. 1 and the like and explanation of the contents in common to those of the first and second embodiments is omitted or simplified and in the following, different points are explained mainly.

Wire Connection Specifications of USB

Figure 7A:
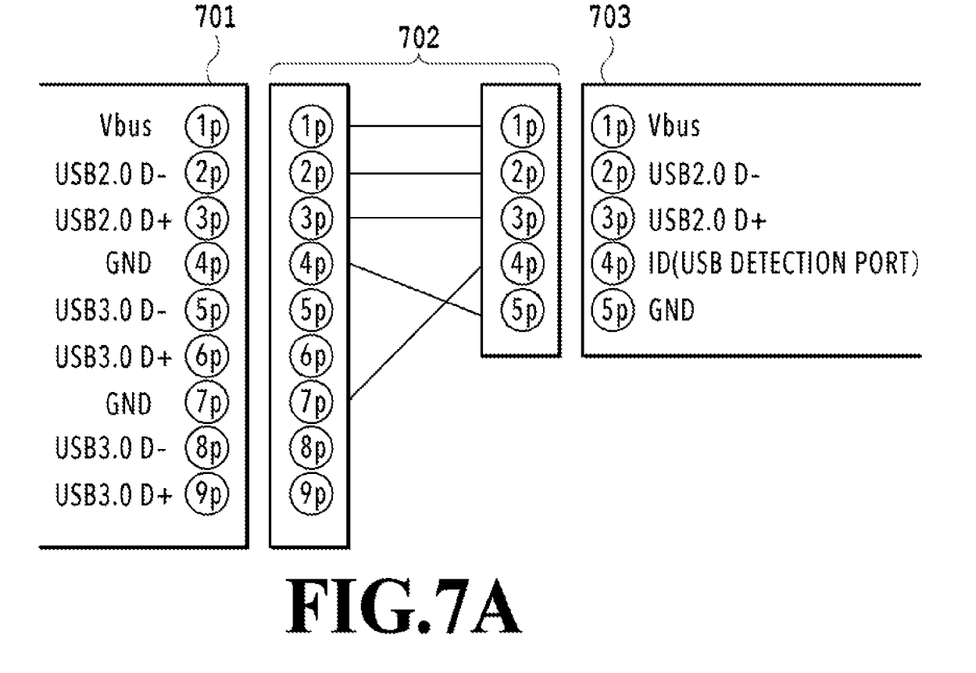
FIG. 7A is a diagram showing wire connection specifications in a case where a USB connector on a PC side is compatible with USB 3.0
Figure 7B:
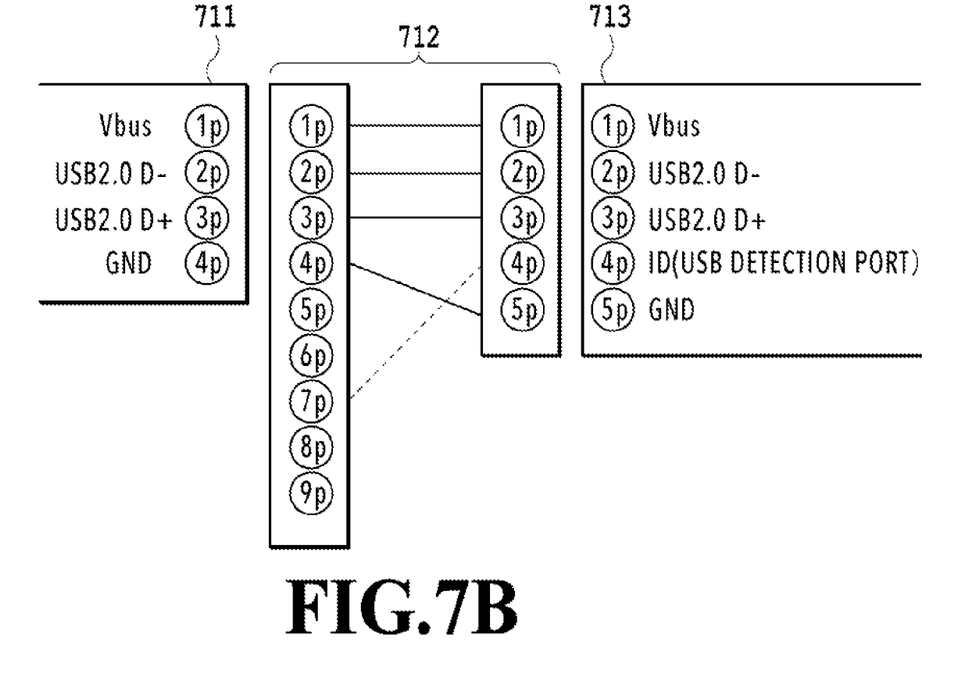
FIG. 7B is a diagram showing wire connection specifications in a case where a USB connector on the PC side is compatible with USB 2.0.

FIG. 7A is wire connection specifications in a case where a USB connector 701 on the PC 120 side is compatible with USB 3.0 and FIG. 7B is wire connection specifications in a case where a USB connector 711 on the PC 120 side is compatible with USB 2.0. In FIG. 7A and FIG. 7B, 702 and 712 indicate USB cables and 703 and 713 indicate USB connectors on the SFS 100 side.

According to the pin arrangement shown in FIG. 7A, the first pin (1p) is Vbus. The second pin (2p) is a USB 2.0 differential signal D−. The third pin (3p) is a USB 2.0 differential signal D+. The fourth pin (4p) is a GND. The fifth pin is a USB 3.0 signal transmission line (−). The sixth pin (6p) is a USB 3.0 signal transmission line (+). The seventh pin (7p) is a GND (ground potential). The eighth (8p) is a USB 3.0 signal reception line (−). The ninth pin (9p) is a USB 3.0 signal reception line (+). Here, the USB connector 701 on the PC 120 side adopts a standard A compatible with USB 3.0 and the USB connector 703 on the SFS 100 side adopts a mini or micro B. As described above, a case may occur where the connector on the power supply side of the connectors on both sides of the USB cable 702 is compatible with the USB 3.0 standard and the connector on the power reception side is compatible with the USB 2.0 standard. In the present embodiment, the fourth pin (4p) in the connector 703 on the SFS 100 side is used as a USB detection port. Then, wiring is performed so that the first pin, the second pin, the third pin, the fourth pin, and the seventh pin on the PC 120 side of the USB cable 702 are connected with the first pin, the second pin, the third pin, the fifth pin, and the fourth pin on the device 100 side.

According to the pin arrangement shown in FIG. 7B, the first pin (1p) is Vbus. The second pin (2p) is a USB 2.0 differential signal D−. The third pin (3p) is a USB 2.0 differential signal D+. The second pin and the third pin are communication terminals. The fourth pin (4p) is a GND. The USB connector 711 on the PC 120 side adopts the standard A of the USB 2.0 standard. The USB cable and the USB connector on the SFS 100 side are the same as those in FIG. 7A described previously.

The important point in the wire connection specifications in FIG. 7A and FIG. 7B is that the fourth pin of the USB connector 703 on the SFS 100 side is connected to the seventh pin on the PC 120 side. In a case where the SFS 100 is connected to the host device compatible with USB 3.0, the seventh pin on the host device side of the USB cable 702 becomes the GND. On the other hand, in a case where the SFS 100 is connected to the host device compatible with USB 2.0, the seventh pin on the host device side of the USB cable 702 becomes open. Consequently, by checking the voltage applied to the fourth pin on the SFS 100 side, it is possible to determine which of USB 3.0 (high standard) and USB 2.0 (low standard) the SFS 100 is connected to. Specifically, by determining whether or not the voltage applied to the fourth pin on the SFS 100 side exceeds a threshold value or by determining whether or not the voltage applied to the fourth pin on the SFS 100 side is a predetermined value, it is possible to determine which of USB 3.0 and USB 2.0 the SFS 100 is connected to. As described above, in the present embodiment, the fourth pin of the USB connector on the electronic device side that receives supply of power from the host device is used as the USB standard detection port. The wire connection specifications are not limited to the example described above and what is required is, for example, to be capable of attaining the object similarly as disclosed in Japanese Patent Laid-Open No. 2012-185661.

As described above, it is possible for the SFS 100 to determine the standard made use of for the connection with the PC 120. Then, in a case of determining that the SFS 100 is connected with the PC 120 by the USB 2.0 standard, the SFS 100 operates in the operation mode in which the current corresponding to the maximum power consumption of the SFS 100 itself is smaller than or equal to 500 mA. That is, the SFS 100 requests the PC 120 to supply power corresponding to 500 mA at the maximum and receives supply of power corresponding to 500 mA at the maximum from the PC 120. Further, in a case of determining that the SFS 100 is connected with the PC 120 by the USB 3.0 standard, the SFS 100 operates in the operation mode in which the current corresponding to the maximum power consumption of the SFS 100 itself is smaller than or equal to 900 mA. That is, the SFS 100 requests the PC 120 to supply power of 900 mA and receives supply of power corresponding to 900 mA at the maximum from the PC 120. However, depending on the USB cable made use of for connection with the PC 120, there is a case where it is not possible for the SFS 100 to perform the above-described determination correctly. Specifically, in a case where the USB cable made use of for connection with the PC 120 is not a cable whose pin arrangement is not that as explained in FIG. 7, there is a case where it is not possible for the SFS 100 to perform the above-described determination correctly.

That is, in a case where the USB cable made use of for connection with the PC 120 is not a cable whose pin arrangement is not that as explained in FIG. 7, there is a possibility that the SFS 100 erroneously determines the standard made use of for connection with the PC 120. Then, in a case where the standard made use of for connection with the PC 120 is determined erroneously, for example, the SFS 100 may operate so as to receive supply of power corresponding to 900 mA from the PC 120 despite that the SFS 100 is actually connected with the PC 120 by the USB 2.0 standard. In the situation such as this, the PC 120 is requested to supply power of 900 mA although it is not possible for the PC 120 to stably supply power of 900 mA, and therefore, there is such a problem that the PC 120 is overloaded.

Consequently, in the present embodiment, an aspect is explained in which the PC 120 is suppressed from being overloaded even in a case where the standard made use of for connection with the PC 120 is determined erroneously.

Figure 8:
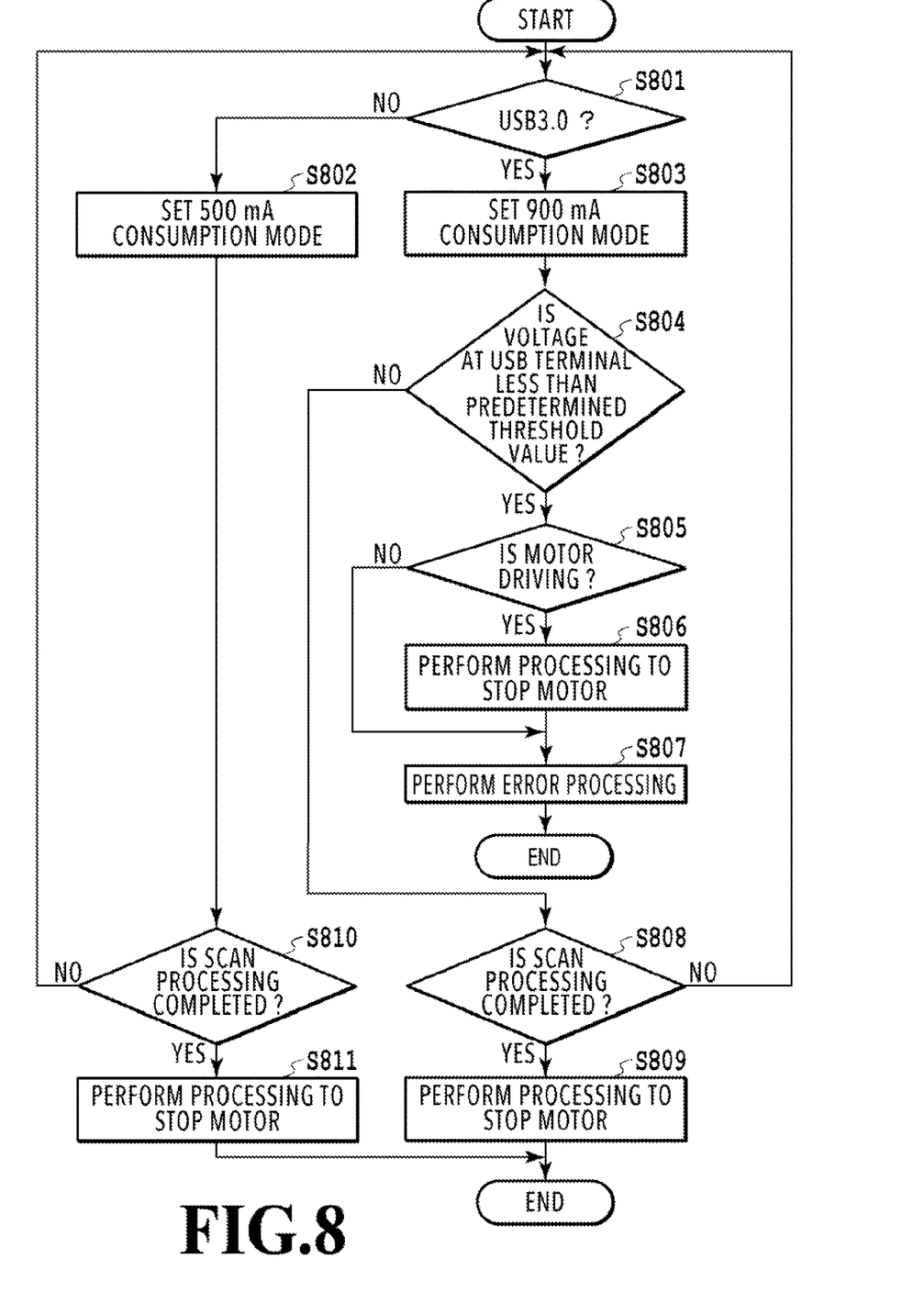
FIG. 8 is a flowchart showing a coping method in a case where power supplied from a host device drops according to a third embodiment.

FIG. 8 is a flowchart showing details of coping in the SFS 100 in a case where the supply of power from the PC 120 drops, according to the present embodiment. The SFS 100 of the present embodiment sets a different operation mode in accordance with whether the USB standard by which the SFS 100 is connected with the PC 120 is USB 3.0 or USB 2.0. Then, only in the case of USB 3.0, the voltage at the USB terminal is monitored and in a case where a drop in voltage larger than or equal to a predetermined value is detected, the SFS 100 performs control to notify a user that the used USB cable is not a compatible one. In the following, detailed explanation is given along the flow in FIG. 8.

At S801 immediately after the start of processing, as described above, the USB standard by which the SFS 100 is connected with the PC 120 is determined based on the electric potential applied to the specific pin as the USB standard detection port. In a case where the USB standard is USB 2.0, the processing advances to S802. On the other hand, in a case where the USB standard is USB 3.0, the processing advances to S803.

At S803, in order to correspond to that the power supply capacity of the PC 120 is 900 mA, the SFS 100 is caused to operate in the mode in which the PC 120 is requested to supply power corresponding to 900 mA. In other words, the SFS 100 is caused to operate in the mode in which the SFS 100 receives supply of power corresponding to 900 mA at the maximum from the PC 120 because the maximum power consumption is power corresponding to 900 mA. Further, the operation mode of the SFS 100 is set to the normal mode and the processing advances to S804.

At S804, whether or not the voltage at the USB terminal is less than a predetermined threshold value is determined. This processing is the same as that at S501. In a case where results of this determination are YES, the processing advances to S805 and the operation mode of the SFS 100 is caused to shift and in a case where results of this determination are NO, the processing advances to S808 and the operation mode of the SFS 100 is maintained.

At S805, whether or not the motor is driving is determined. This processing is the same as that at S502. In a case where results of this determination are YES, the processing advances to S806 and in a case where results of this determination are NO, the processing advances to S807.

At S806, processing to stop the motor is performed by the motor control unit 110c. This processing is the same as that at S503.

At S807, error processing is performed by the main control unit 101. This processing is the same as that at S504. In a case where a drop in the voltage at the USB terminal is found even though the USB type is determined to be USB 3.0, there is a possibility the determination of the USB type has not been performed correctly. As described above, as the cause of the occurrence of such a phenomenon, for example, a case is considered where a USB cable of different wire connection specifications is used even though the SFS 100 is designed on the premise that the USB cable of the wire connection specifications shown in FIG. 7A and FIG. 7B described above is used. Consequently, in the error processing in the present embodiment, a message or the like to the effect that the USB cable being used is abnormal is also displayed. After the error processing such as this is completed, this processing is terminated.

Processing in a case where the voltage at the USB terminal is not less than a predetermined threshold value is explained. At S808, whether or not the scan processing is completed is determined. This processing is the same as that at S505. In a case where results of this determination are YES, the processing advances to S809 and in a case where results of this determination are NO, the processing returns to S801. In a case where results of this determination are NO, the processing may return to S804.

At S809, processing to stop the motor is performed by the motor control unit 110c. This processing is the same as that at S503. After this, the processing of this flowchart is terminated.

Processing in a case where the USB standard is determined to be USB 2.0 is explained. At S802, in order to correspond to that the power supply capacity of the PC 120 is 500 mA, the SFS 100 is caused to operate in the mode in which the PC 120 is requested to supply power of 500 mA at the maximum. In other words, the SFS 100 is caused to operate in the mode in which the SFS 100 receives supply of power corresponding to 500 mA at the maximum from the PC 120 because the maximum power consumption is power corresponding to 500 mA. Further, after setting the operation mode of the SFS 100 to the low power mode, the processing advances to S810. The specific operation contents in the low power mode, such as the operation to reduce the speed of the scan processing, are the same as those already described in the first embodiment, and therefore, explanation is omitted. The operation mode of the SFS 100, which is set at this time, only needs to be an operation mode corresponding to that the power supply capacity of the PC 120 is 500 mA, and the operation mode may not be the low power mode. At least power the PC 120 is requested to supply only needs to be power compatible with USB 2.0.

At S810, whether or not the scan processing is completed is determined. This processing is the same as that at S505. In a case where results of this determination are YES, the processing advances to S811 and in a case where results of this determination are NO, the processing returns to S801. In a case where results of this determination are NO, it may also be possible to perform S810 again.

At S811, processing to stop the motor is performed by the motor control unit 110c. This processing is the same as that at S503. After this, the processing of this flowchart is terminated.

The above is the coping method in the SFS 100 in a case where the supply of power from the PC 120 drops in the present embodiment.

In a case of the present embodiment, as in the first and second embodiments, in addition to that it is possible to prevent the host device on the side that supplies power from being overloaded, it is possible to prompt a user to exchange the interface cable in a case where the wire connection specifications thereof are not correct.

In the present embodiment, the aspect is explained in which the scan processing being performed by the SFS 100 is stopped in a case where the voltage at the USB terminal is less than a predetermined threshold value, but the aspect is not limited to this. As explained in the second embodiment described previously, the scan processing may be continued by changing the operation mode of the SFS 100. Further, in such a situation, the power consumption of the operation mode and the control of the mode in a case where the USB standard is USB 2.0 and the power consumption of the operation mode and the control of the mode in a case where the USB standard is USB 3.0 and the voltage at the USB terminal is less than a predetermined threshold value may be different. It is only required for at least the power consumption of both the operation modes to be smaller than the power consumption of the operation mode in a case where the USB standard is USB 3.0 and the voltage at the USB terminal is not less than a predetermined threshold.

Other Embodiments

Embodiment(s) of the present invention can also be realized by a computer of a system or device that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or device by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to appropriately cope with that power supplied to a power receiving apparatus from an external device is not appropriate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-145000, filed Aug. 1, 2018 which is hereby incorporated by reference wherein in its entirety.

What is claimed is:

1. A power receiving apparatus that is enabled to drive by receiving supply of power from a power supplying device outside the power receiving apparatus and operates in any of a plurality of states including a first power state and a second power state where power consumption is smaller than that in the first power state, the power receiving apparatus comprising:
    a receiving unit configured to receive supply of power whose magnitude is based on power consumption of the power receiving apparatus from the power supplying device via a predetermined interface;

a determining unit configured to determine an application state related to application of voltage in a predetermined pin included in a connector of the predetermined interface;

a first operation control unit configured to cause the power receiving apparatus to operate in the first power state based on the fact that the application state in the predetermined pin is a first application state and configured to cause the power receiving apparatus to operate in the second power state based on a fact that the application state in the predetermined pin is a second application state; and a second operation control unit configured to, after the power receiving apparatus is caused to operate in the first power state, keep the power receiving apparatus to operate in the first power state based on a fact that voltage at a terminal of the predetermined interface is a first value, and configured to, after the receiving apparatus device is caused to operate in the first power state, cause the power receiving apparatus to operate in a predetermined power state where power consumption is smaller than that in the first power state based on a fact that the voltage at the terminal of the predetermined interface is a second value less than the first value.

2. The power receiving apparatus according to claim 1, wherein the predetermined power state is a state where an image reading unit included in the power receiving apparatus, which is configured to optically read a document, is not moved.

3. The power receiving apparatus according to claim 1, wherein the first power state is a state where a reading unit included in the power receiving apparatus, which is configured to read a document, is moved at a first speed and the second power state is a state where the image reading unit is moved at a second speed slower than the first speed.

4. The power receiving apparatus according to claim 1, wherein the first power state is a state where a lighting time each time one line is read by an image reading unit included in the power receiving apparatus, which is configured to optically read a document, is a first length and the second power state is a state where a lighting time each time one line is read by the image reading unit is a second length shorter than the first length.

5. The power receiving apparatus according to claim 1, wherein a standard that is used for connection between the power receiving apparatus and the power supplying device in a case where the voltage at the terminal of the predetermined interface is the first value is a Universal Serial Bus 3.0 standard, and a standard that is used for connection between the power receiving apparatus and the power supplying device in a case where the voltage at the terminal of the predetermined interface is the second value is a Universal Serial Bus 2.0 standard.

6. The power receiving apparatus according to claim 1, further comprising:

a notification unit configured to notify, in a case where the voltage at the terminal of the predetermined interface is the second value, a user of this.

7. The power receiving apparatus according to claim 1, wherein the predetermined interface is a Universal Serial Bus.

8. The power receiving apparatus according to claim 1, further comprising:

an acquisition unit configured to acquire image data based on a document by moving a reading unit included in the power receiving apparatus, which is configured to read the document.

9. The power receiving apparatus according to claim 1, wherein the first application state is a state where a second predetermined pin that is included in a connector of the power supplying device and is connected to the predetermined pin in the predetermined interface is a GND; and the second application state is a state where the predetermined pin in the predetermined interface is open.

10. The power receiving apparatus according to claim 1, further comprising:

a voltage determining unit configured to perform a predetermined determining process for determining whether or not power which the voltage at the terminal of the predetermined interface is the first value in a case where the application state in the predetermined pin is the first application state, wherein the power receiving apparatus operates in the first power state or the predetermined power state based on a result of the predetermined determining process in a case where the application state in the predetermined pin is the first application state.

11. The power receiving apparatus according to claim 10, wherein the power receiving apparatus operates in the second power state without performing the predetermined determining process in a case where the application state in the predetermined pin is the second application state.

12. A control method of a power receiving apparatus that is enabled to drive by receiving supply of power from a power supplying device outside the power receiving apparatus and operates in any of a plurality of states including a first power state and a second power state where power consumption is smaller than that in the first state, the control method comprising the steps of:

receiving supply of power whose magnitude is based on power consumption of the power receiving apparatus from the power supplying device via a predetermined interface;

determining an application state related to application of a voltage in a predetermined pin included in a connector of the predetermined interface;

causing the power receiving apparatus to operate in the first power state based on a fact that the application state in the predetermined pin is the first application state and causing the power receiving apparatus to operate in the second power state based on a fact that the application state in the predetermined pin is a second application state; and keeping, after the power receiving apparatus is caused to operate in the first power state, the power receiving apparatus to operate in the first power state based on a fact that voltage at a terminal of the predetermined interface is a first value, and causing the power receiving apparatus to operate in a predetermined power state where power consumption is smaller than that in the first power state based on a fact that the voltage at the terminal of the predetermined interface is a second value less than the first value.

13. A non-transitory computer readable storage medium storing a program for causing a computer to perform a control method of a power receiving apparatus that is enabled to drive by receiving supply of power from a power supplying device outside the power receiving apparatus and operates in any of a plurality of states including a first power state and a second power state where power consumption is smaller than that in the first state, the control method comprising the steps of:

receiving supply of power whose magnitude is based on power consumption of the power receiving apparatus from the power supplying device via a predetermined interface;

determining an application state related to application of a voltage in a predetermined pin included in a connector of the predetermined interface;

causing the power receiving apparatus to operate in the first power state based on a fact that the application state in the predetermined pin is the first application state and causing the power receiving apparatus to operate in the second power state based on a fact that the application state in the predetermined pin is a second application state; and keeping, after the power receiving apparatus is caused to operate in the first power state, the power receiving apparatus to operate in the first power state based on a fact that voltage at a terminal of the predetermined interface is a first value, and causing the power receiving apparatus to operate in a predetermined power state where power consumption is smaller than that in the first power state based on a fact that the voltage at the terminal of the predetermined interface is a second value less than the first value.

\* \* \* \* \*